United States Patent [19]
Izumita et al.

[11] Patent Number: 4,733,313
[45] Date of Patent: Mar. 22, 1988

[54] DIGITAL RECORDING AND PLAYBACK SYSTEM FOR X-RAY VIDEO SIGNALS

[75] Inventors: Morishi Izumita, Inashiro; Seiichi Mita, Kanagawa; Nobukazu Doi; Shusaku Nagahara, both of Hachioji; Shigeyuki Ikeda, Katsushika, all of Japan

[73] Assignees: Hitachi, Medical Corp.; Hitachi Ltd., both of Japan

[21] Appl. No.: 854,512

[22] Filed: Apr. 22, 1986

[30] Foreign Application Priority Data

Apr. 23, 1985 [JP] Japan ................................. 60-86799

[51] Int. Cl.⁴ .......................... H04N 5/78; A61B 6/02
[52] U.S. Cl. ................................. 360/33.1; 358/111; 358/160; 360/32
[58] Field of Search ................. 358/111, 160; 360/32, 360/33.1; 364/414

[56] References Cited

U.S. PATENT DOCUMENTS

| | | | |
|---|---|---|---|
| 4,204,225 | 5/1980 | Mistretta | 358/111 |
| 4,204,226 | 5/1980 | Mistretta | 358/111 |
| 4,318,137 | 3/1982 | Cordova et al. | 360/32 |
| 4,355,330 | 10/1982 | Fukui | 358/111 |
| 4,444,196 | 4/1984 | Stein | 358/111 X |
| 4,449,195 | 5/1984 | Andrews et al. | 358/111 |
| 4,450,478 | 5/1984 | Ledley | 358/111 |
| 4,458,267 | 7/1984 | Dolazza | 358/111 |
| 4,467,373 | 8/1984 | Taylor et al. | 260/32 X |
| 4,477,844 | 10/1984 | Nakano et al. | 360/32 X |
| 4,532,546 | 7/1985 | Aufiero et al. | 358/111 |
| 4,533,947 | 8/1985 | Smith | 358/111 |
| 4,559,557 | 12/1985 | Keyes et al. | 364/414 X |
| 4,571,619 | 2/1986 | Mewitz | 358/111 X |
| 4,597,020 | 6/1986 | Wilkinson | 360/32 X |

FOREIGN PATENT DOCUMENTS

2153180 8/1985 United Kingdom ................ 358/111

OTHER PUBLICATIONS

Electromedica 3-4/1977; "High Resolution X-Ray Television and the High Resolution Video Reorder", (pp. 83-91), Haendle et al.
Spie, vol. 233; 1980, pp. 54-60; "Digital Acquisition System for Photo-Electronic-Radiology a Performance Overview"; Frost et al.
Electromedica, 2-3/1975, pp. 48-55; "The Sivetem, a Computerized Transverse Axial Tomograph for Brain Scanning"; Führer et al.
Spie, vol. 127, 1977, pp. 208-2115; "A Digital Video Acquisition System for Extraction of Subvisual Information in Diagnostic Medical Imaging"; Frost et al.
Electronics, vol. 49, No. 3, pp. 94-100, Feb. 76; "Digital Techniques Promise to Clarify the Television Picture"; Goldberg.

*Primary Examiner*—Aristotelis M. Psitos
*Attorney, Agent, or Firm*—Antonelli, Terry & Wands

[57] ABSTRACT

In medical image treating systems, especially when an X-ray image intensifier and TV camera are used, video signals composed of available video signals containing specified image information and unavailable video signals containing no such image information are output from the TV camera. Only the digital video signals of the converted digital video signals corresponding to the available video signals are treated and the digital video signals after treatment are recorded and reproduced with a recording device.

4 Claims, 19 Drawing Figures

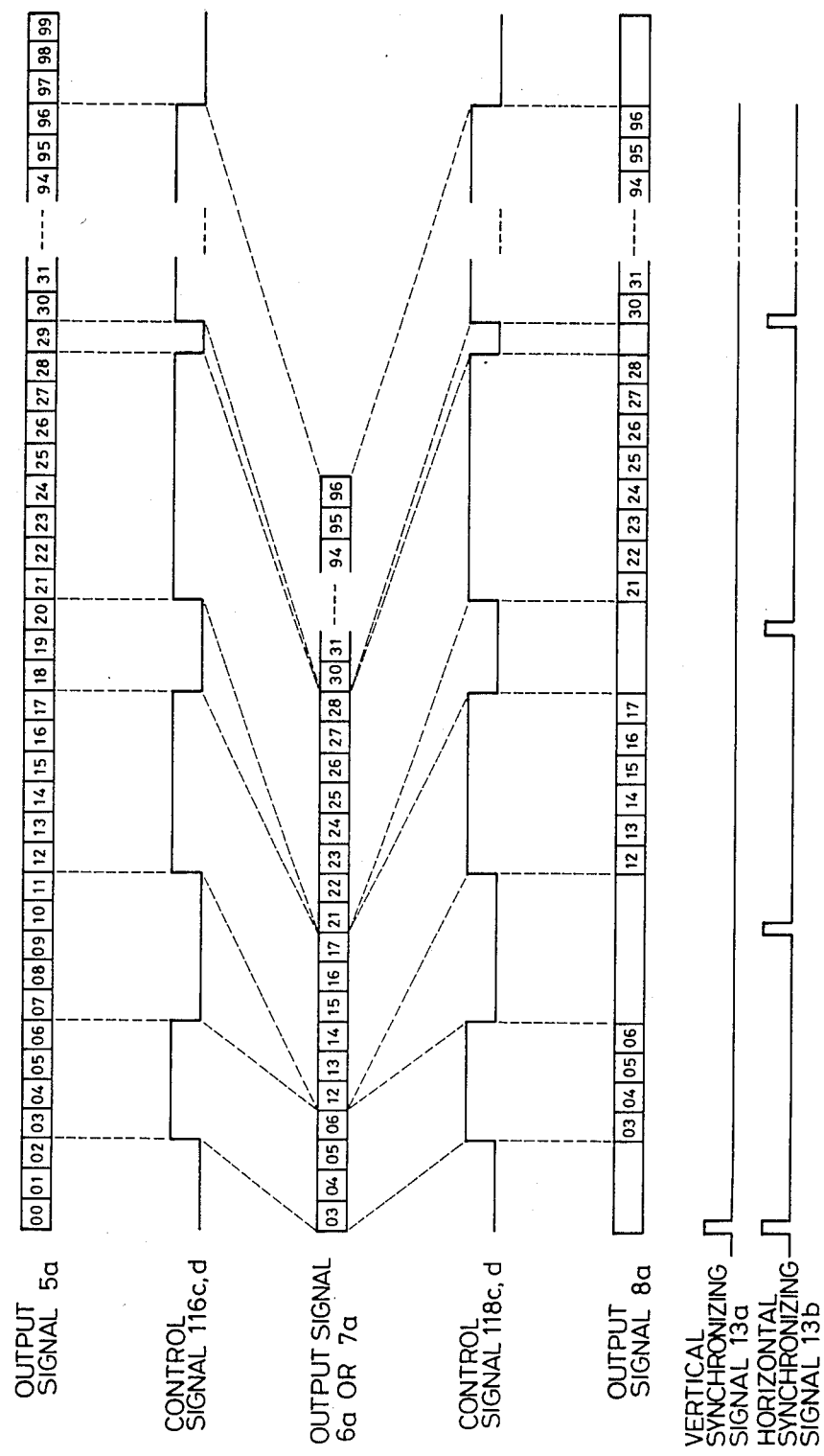

FIG. 9
| L1 | L2 | L3 | 03 | 04 | 05 | 06 | L4 | L5 | L6 |
|----|----|----|----|----|----|----|----|----|----|
| L7 | L8 | 12 | 13 | 14 | 15 | 16 | 17 | L9 | L10 |
| L11 | 21 | 22 | 23 | 24 | 25 | 26 | 27 | 28 | L12 |
| 30 | 31 | 32 | 33 | 34 | 35 | 36 | 37 | 38 | 39 |
| 40 | 41 | 42 | 43 | 44 | 45 | 46 | 47 | 48 | 49 |
| 50 | 51 | 52 | 53 | 54 | 55 | 56 | 57 | 58 | 59 |
| 60 | 61 | 62 | 63 | 64 | 65 | 66 | 67 | 68 | 69 |
| L13 | 71 | 72 | 73 | 74 | 75 | 76 | 77 | 78 | L14 |
| L15 | L16 | 82 | 83 | 84 | 85 | 86 | 87 | L17 | L18 |
| L19 |  |  | 93 | 94 | 95 | 96 |  |  |  |
FIG. 10
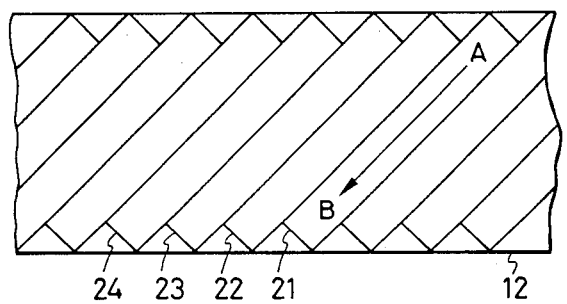
FIG. 11
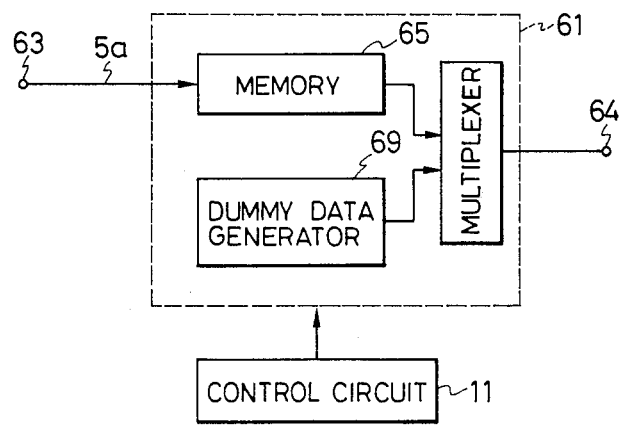

DIGITAL RECORDING AND PLAYBACK SYSTEM FOR X-RAY VIDEO SIGNALS

BACKGROUND OF THE INVENTION

1. Field of the Invention

This invention is related to a method of converting digital data when recording and playing back digitalized TV video signals and especially to a method of recording and playing back data of medical image diagnostic apparatus, etc.

2. Description of the Invention

Recently, as computers have become popular, medical image diagnostic apparatuses with a computer have been employed so that diagnostic image data has become digitalized. Initially, CT (computed tomography), for still pictures were made and recently DSA (digital subtraction angiography) etc. for moving pictures, have appeared (U.S. Pat. No. 4,204,225, U.S. Pat. No. 4,204,226).

FIG. 1 shows an image input system of a DSA. The X-rays generated in the X-ray source are transmitted through the subject 2 and enter the image intensifier 3 to produce an X-ray image. The image intensifier 3 projects a circular visible image corresponding to the X-ray image. The TV camera 4 picks up the entire circular visible image, converts it to a video signal and outputs. The video signal obtained in this manner is treated in various ways and recorded on an analog VTR, digital disc recorder, etc.

The visible image projected on the image intensifier 3 used for this DSA is circular, while the image pickup (scanning) region is approximately rectangular (as in usual TV pictures). Therefore, the circular visible image region should be contained within the image pickup region (regular square). In this case, assuming the radius of the visible image as A, the area where the image pickup region and visible image region are overlapped, that is, the available image pickup (scanning) region ($\pi A^2$) containing image information is about 80% of the entire image pickup region ($4A^2$). The residual area of about 20% is unavailable image pickup region containing no image information for this part of the video signal. Since the image signal converted with the TV camera 4 contains this unavailable video signal, the DSA treats the unnecessary signal also and records it.

In usual TV systems, image signals are digitalized in 8 or less number of bits when recorded. In the case of images for medical diagnosis, higher resolution than in usual TV pictures is required and the signals should be quantized at more than 9 or 10 bits. Therefore, data processing at higher speed and larger capacity than in usual TV signals is required. Such unavailable video signals containing no information as image signals are usually quantized at more than 9 or 10 bits and then the quantized signals are processed and recorded.

As described above, treating and recording unavailable video signals containing no image information and available video signals containing video signals together lead to functional deterioration of the entire system because of the unavailable video signals. Especially when these video signals are quantized and transmitted or recorded and played back, there are difficulties with respect to recording capacity, etc.

SUMMARY OF THE INVENTION

The object of this invention is to provide a digital data conversion method to transmit or record and play back video signals composed of available and unavailable video signals, when a medical image processing system and especially when an X-ray image intensifier and TV camera are used.

Another object of this invention is to provide a digital data conversion method to record or play back the above described video signals with a digital VTR, etc.

This invention treats only digital video signals corresponding to available image signals and records or plays back them when recording or playing back digital image signals composed of available and unavailable image signals.

According to this invention, it becomes possible to record and play back medical video signals or other data effectively with a system to record and play back quantized TV video signals, etc.

These and other objects, features and advantages of the invention will become more apparent upon a reading of the following detailed description and drawing.

BRIEF DESCRIPTION OF THE DRAWINGS

FIG. 4 shows the output at each part of the system in FIG. 3 to be used for explaining an embodiment of this invention.

FIG. 5, consisting of 5A–5D, shows the process of data conversion corresponding to FIG. 4.

FIGS. 8A, 8B and 9 show the process of data conversion in another embodiment of the present invention.

FIG. 10 shows a data format recorded on the magnetic tape.

FIGS. 11 and 14 show another composition of the field memory 61 in FIG. 6.

DETAILED DESCRIPTION OF THE PREFERRED EMBODIMENT

An embodiment of this invention is described in details below referring to the figures.

Figure 1:
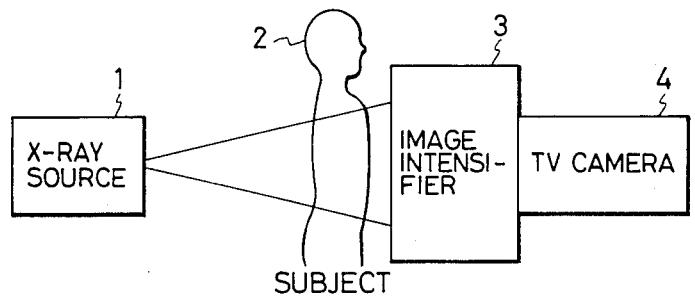
FIG. 1 shows a typical example of existing X-ray system and camera system.
Figure 2:
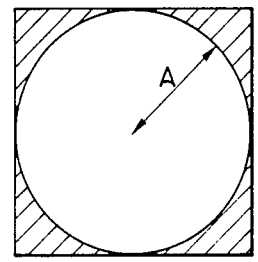
FIG. 2 shows an expanded view of an image pickup area of the camera system in FIG. 1.
Figure 3:
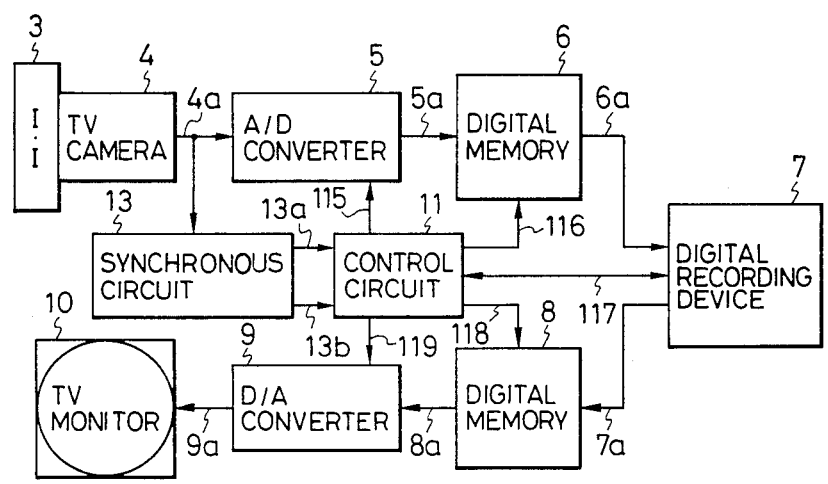
FIG. 3 shows a composition of a recording/playback system in an embodiment of the present invention.

FIG. 3 is a block diagram of a digital data recording/playback system which is an embodiment of the present invention. This system converts TV signals into digital data and records and plays it back. In FIG. 3, 3 indicates an image intensifier to convert input X-rays into visible images, 4 is a TV camera connected to the intensifier 3 to convert the visible image into TV video signals. 5 is an A/D converter to convert analog signals (TV video signals) into digital image signals, 6 is a digital memory to store digital video signals converted by the A/D converter 5, 7 is a digital recording device to record digital signals from the digital memory, 8 is a digital memory to convert the digital signals output from the digital recording device 7 into digital signals again, 9 is a D/A converter to convert the digital video signals into analog signals (original TV signals), 10 is a TV monitor to project TV signal image reproduced, 11 is the control circuit to control the operation of the digital memories 6 and 8, A/D converter 5, and D/A converter 9, and 13 is a synchronous circuit to generate vertical and horizontal synchronous signals of TV signals.

X-rays, after being transmitted through the subject, are converted into a visible image with the image intensifier 3, and then converted into video signals (electric signals) 4a with the TV camera 4. These signals 4a are converted to digital signals 5a with the A/D converter 5 and input to the digital memory 6. This digital memory 6 outputs only available image signals 6a, as described later, which are recorded on magnetic tape, magnetic disk optical disk, or other recording media in the digital recording device 7. The output 7a from the digital recording device 7 is input to the digital memory 8 for playback, converted to digital signals 8a to playback the original image, returned to analog signals 9a with the D/A converter 9, and output on the TV monitor 10.

Figures 5A, 5B, 5C, 5D:
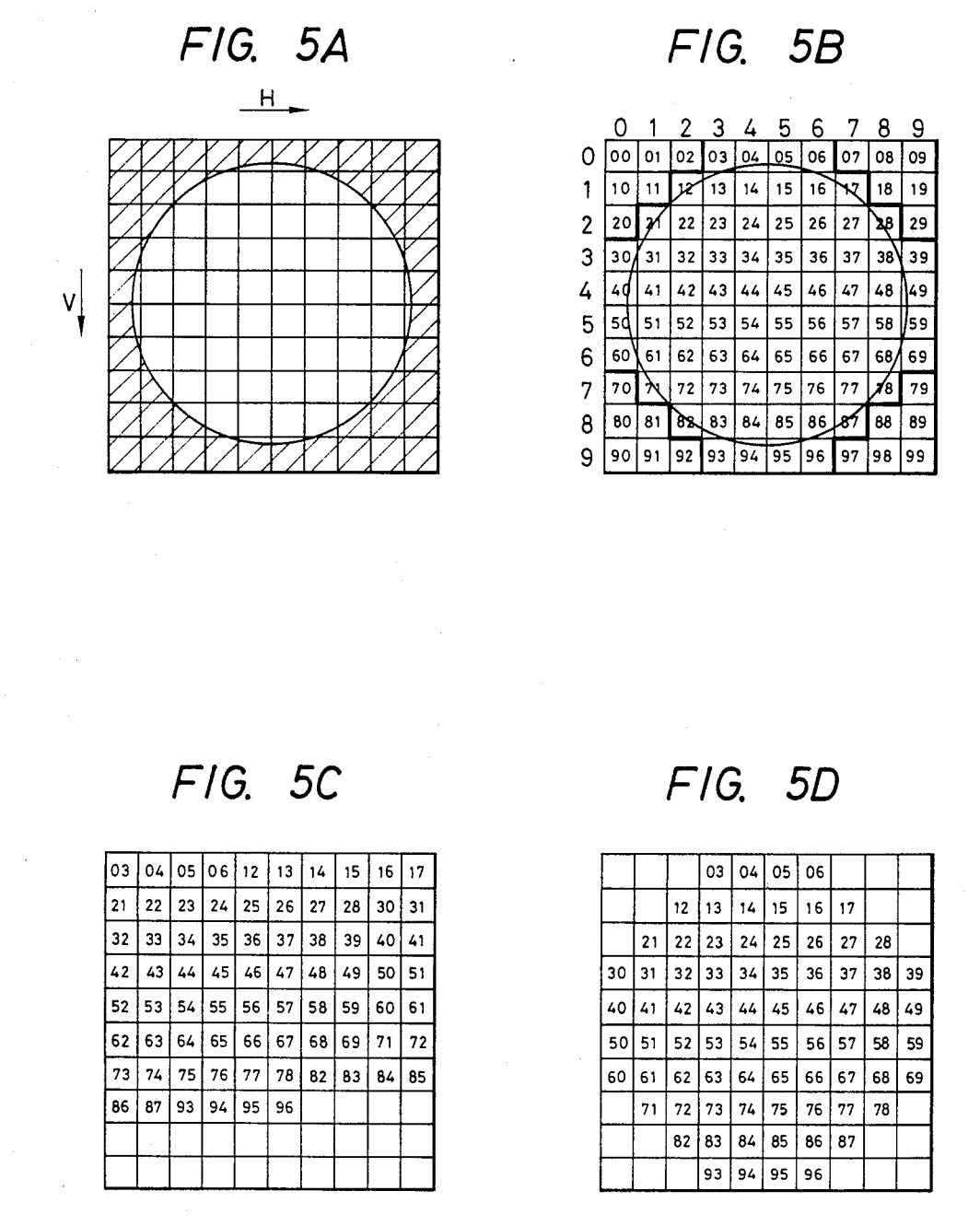
Figure 6A:
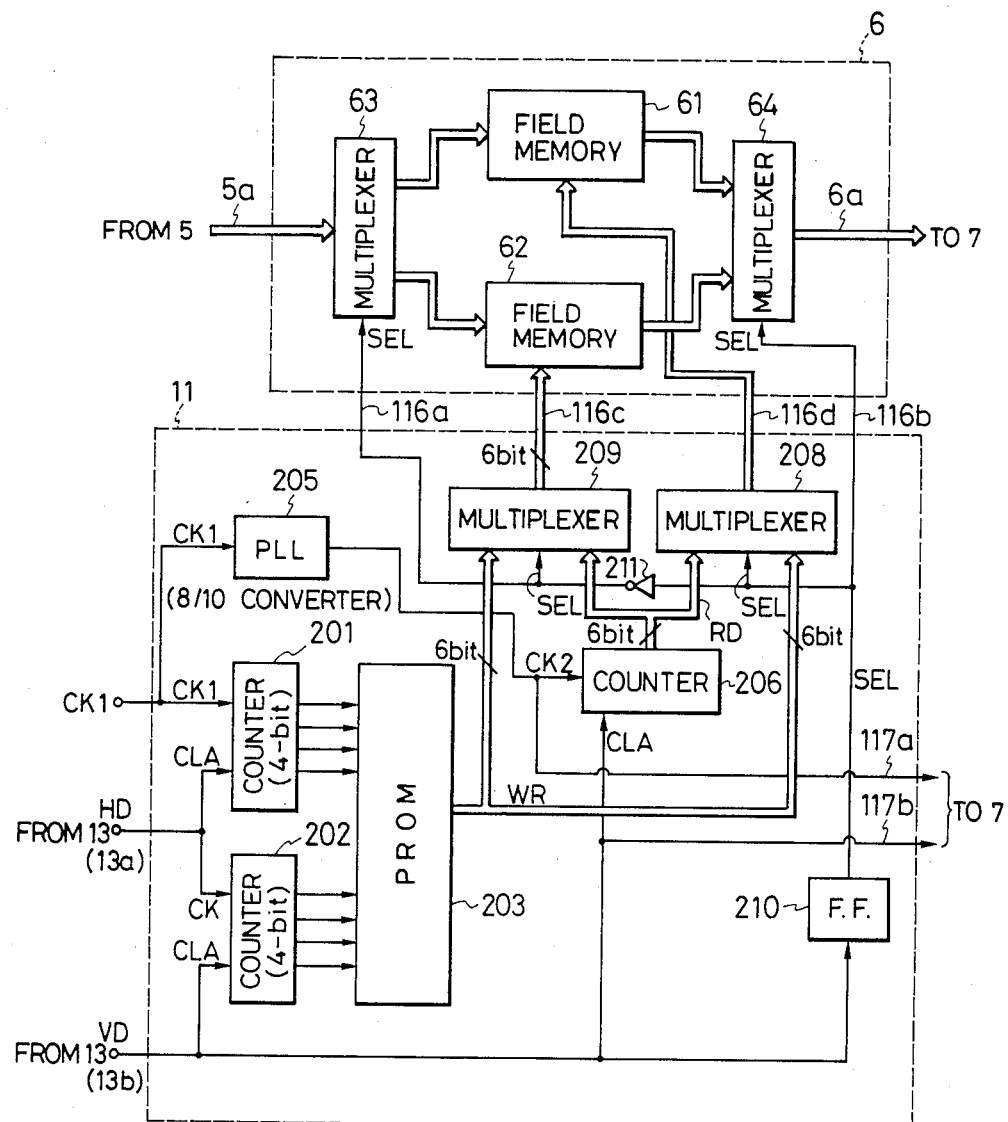
FIGS. 6A and 6B show the compositions of the digital memory and control circuit in FIG. 3.

The operation of this embodiment is described in detail referring to FIGS. 4 and 5. FIG. 5A represents the video signals 4a output from the TV camera typically in 10 picture elements respectively in the horizontal direction H and vertical direction V. In FIG. 5A, the shaded area shows the unavailable video imaging area containing no information and the area in the circle is the available video imaging area with information. The available and unavailable video imaging areas are described with respect to the picture elements in FIG. 5B. In FIG. 5B, picture elements corresponding to the unavailable imaging area are 00, 01, 02, 07, 08, 09, 10, 11, 18, 19, 20, 29, 70, 79, 80, 81, 88, 89, 90, 91, 92, 97, 98, and 99. Video signals are output from the A/D converter as the output 5a in FIG. 4. In the synchronous circuit 13, vertical syncronous signals 13a and horizontal synchronous signals 13b which are synchronized to the output signals 4a from the TV camera 4 are generated and input to the control circuit 11. In the control circuit 11, writing signals to the digital memory 6 are generated based on these signals. The writing signals 116 may be memorized in the read only memory (ROM), etc. beforehand. In the control circuit 11, signals corresponding to the available video signals are written to the digital memory 6 as shown in FIG. 5C according to the writing signals 116. From this digital memory 6, only available video signals are output as the output signals 6a in FIG. 4 and the digital recording device 7 records these available video signals only. Next, playback of video signals is described. The digital recording device 7 outputs the output signals 7a as shown in FIG. 4 (same as the output 6a of the digital memory 6). The digital memory 8 memorizes these output signals 7a as shown in FIG. 5C. The control circuit 11 generates read out signals 118 based on the horizontal and vertical synchronous signals 13a and 13b generated in the synchronous circuit 13 to read out from the digital memory 8 so as to produce the unavailable video imaging area by these read out signals 118. From the digital memory 8, video signals containing available and unavailable video signals as the output signals 8a in FIG. 4 are output. These output signals 8a are converted to analog image signals 9a with the D/A converter 9 and displayed on the TV monitor 10 as shown in FIG. 5D. FIG. 6A shows detailed composition of the digital memory 6 and control circuit 11 at the time of recording.

The digital memory 6 is composed of the field memories 61 and 62 and multiplexers 63 and 64. Writing into and reading out of the field memories 61 and 62 are conducted by the output 116c and 116d of the control circuit 11. The multiplexers 63 and 64 are switched by the output 116a and 116b of the control circuit 11 for each field. By this, the field memories 61 and 62 are used alternately for each field to convert the data. In other words, when the field memory 61 is used for writing the data, the other field memory 62 is used to read out the data. By using the field memories 61 and 62 in turn, the data can be output continuously. The clock pulse for reading out at this time is slower in speed by about 20% than the writing clock pulse.

The operation of the control circuit 11 to control the digital memory 6 is described below. The word clock CK1 and horizontal and vertical synchronous signals 13a and 13b are incorporated into the control circuit 11.

The counter 201 counts the word clock CK1 and gives an address in the direction H in FIG. 5B. The counter 201 is cleared for each horizontal synchronous signal 13a. The counter 202 counts the horizontal synchronous signals 13a and gives an address in the direction V as shown in FIG. 5B. The counter 202 is cleared for each vertical synchronous signal 13b. PROM 203 generates the writing address WR corresponding to the field memories 61 and 62. This writing address WR is fed to the field memories 61 and 62 through the multiplexer 208 and 209. The PLL (Phase Looked Loop) 205 generates the clock CK2 of the frequency of 8/10 from the word clock CK1. The counter 206 divides the frequency of the clock CK2 and generates the reading address RD. This reading address RD is fed to the field memories 61 and 62 through the multiplexer 208 and 209. The flip-flop 210 divides the frequency of the vertical synchronous signals 136, switches the field and generates the pulse SEL.

The field switching pulse SEL is taken directly into the multiplexers 64 and 208 and the field switching pulse SEL reversed by the reversing circuit 211 is taken into the multiplexers 64 and 209. By this, when the multiplexers 63 selects the field memory 62, the multiplexers 64 selects the field memory 61, the multiplexers 209 selects the writing address WR, and the multiplexers 208 selects the reading address RD. The clock CK2 and vertical synchronous signals 13b are output to the digital recording device 7 as recording signals 117a and 117b and recorded at the same as the image signals with the digital recording device 7.

Figure 6B:
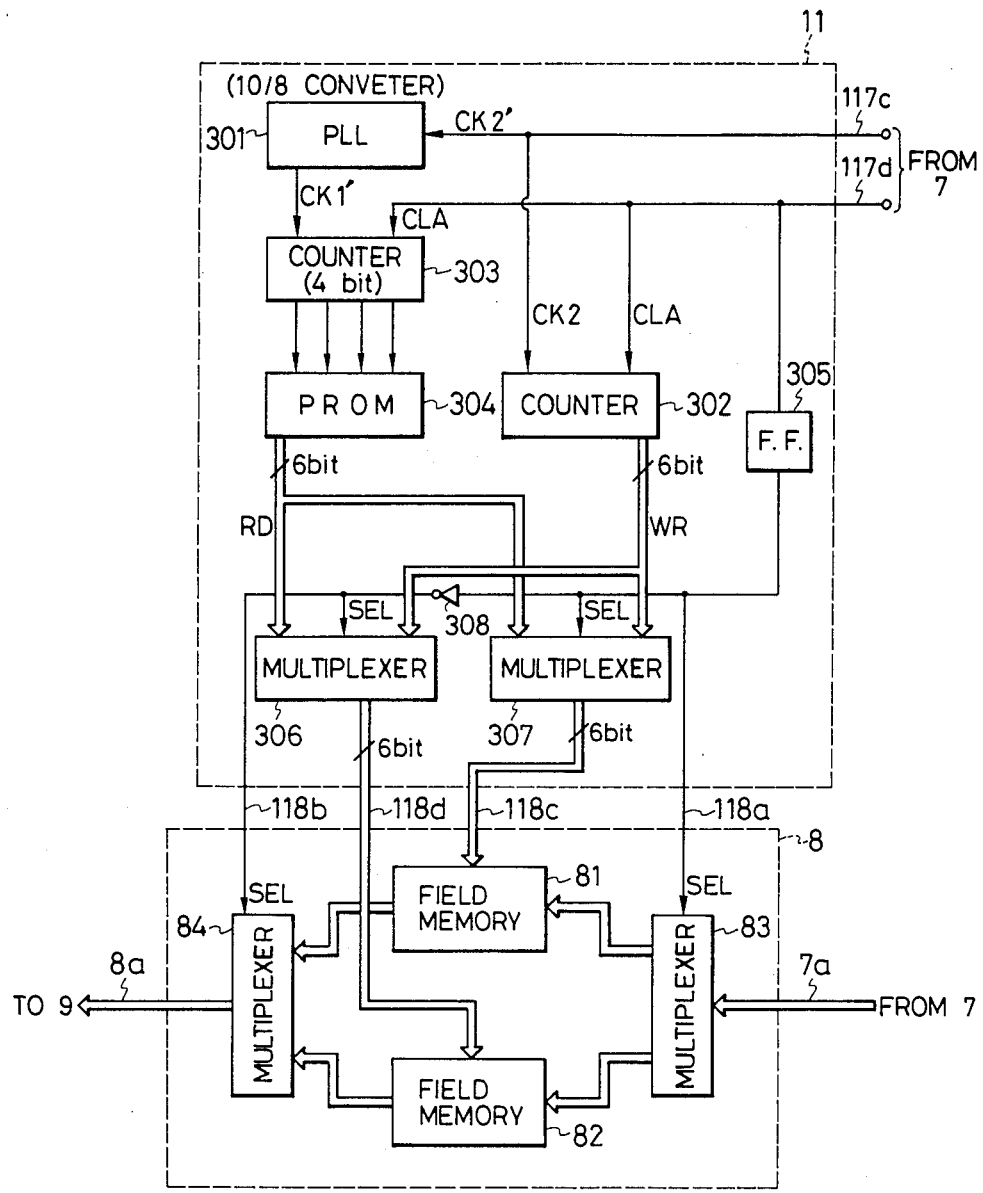

FIG. 6B shows detailed composition of the digital memory 8 and control circuit 11 at the time of playback.

The digital memory 8 has the same composition as that of the digital memory 6. The output signals 7a shown in FIG. 4 are input to the digital memory 8. At the same time, the clock 117C played back with the digital recording device 7 and the vertical synchronous signals 117d are input to the control circuit 11. The clock 117c has the same frequency as that of the clock CK2 at the time of recording in FIG. 6A.

The counter 302 counts down the clock CK2' and generates the writing address WR. The writing address WR is fed to the field memories 81 and 82 through the multiplexers 306 and 307. The data is written into the field memories 81 and 82 by this writing address WR as in FIG. 5C. The counter 302 is cleared by the vertical synchronous signals 117d. The PLL 301 generates the clock CK1' of 10/8 from the clock 117C (CK2'). The clock CK1' has the same frequency as that of the word clock CK1 at the time of recording.

The counter 303 counts down the clock CK1' and outputs the value to the PROM 304. The PROM 304 generates the reading address RD. The reading address RD gives such an address as to read out non-signal (black level, for example) in the term corresponding to unavailable video signals and gives such an address as to read out recorded data shown in FIG. 5C in the term corresponding to unavailable video signals. Such reading addresses are respectively fed to the field memories 81 and 82 through the multiplexers 306 and 307.

The field memories 81 and 82 are switched by the flip-flop 305, multiplexers 306, 308, 83, and 84, and reversing circuit 308 as the case shown in FIG. 6A.

Quantizing of video signals at 10 bits per picture element and recording them with a recording device of 8 bits per picture element are performed in the following way.

To record video signals of 10 bits per picture element with a recording device in the unit of byte (8 bits), 10-bit data should be converted to 8-bit data.

Figure 7:
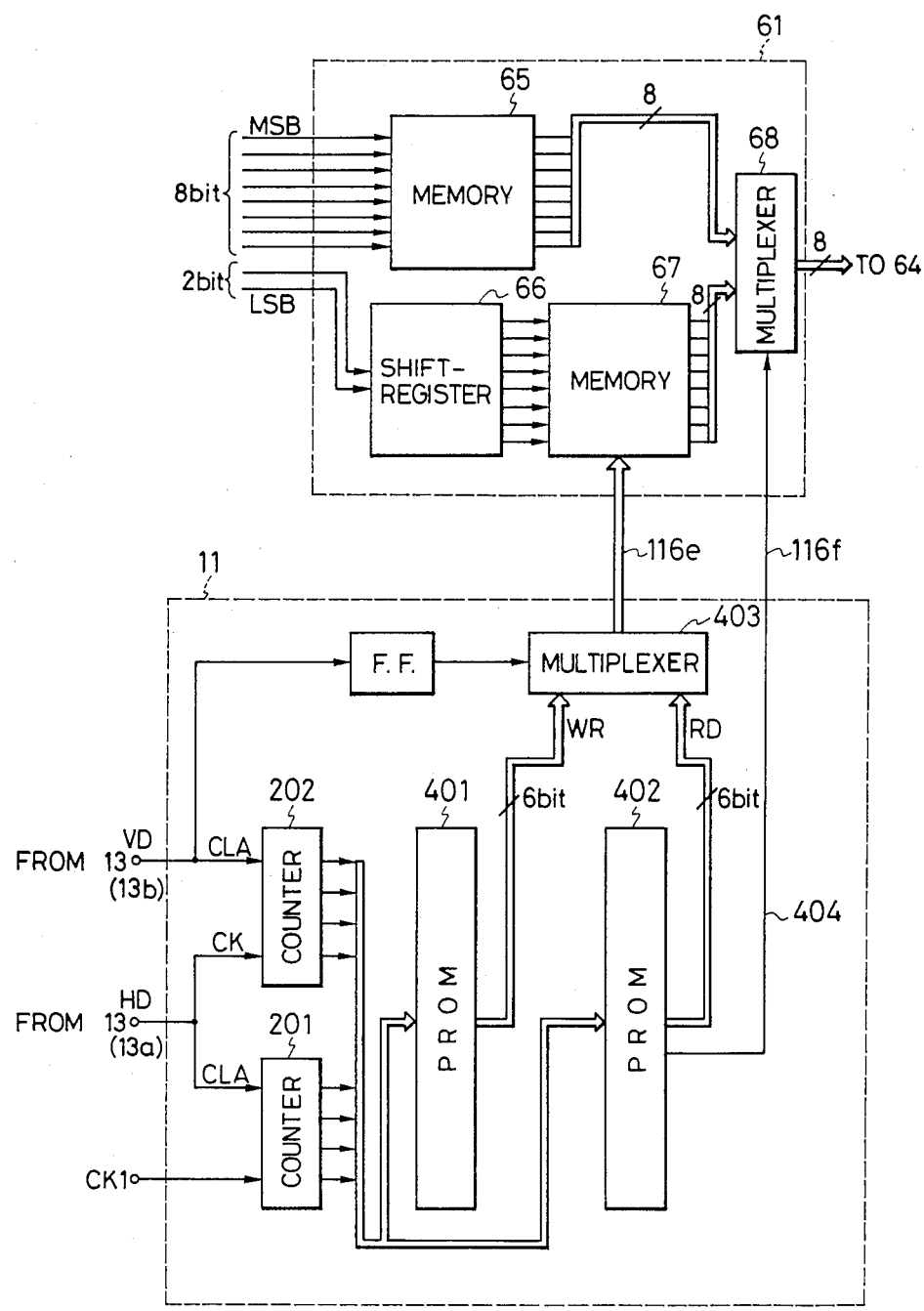
FIG. 7 shows a composition of the field memory 61 and control circuit of FIG. 6.

An example of a circuit to convert 10 bits to 8 bits is shown in FIG. 7. This shows details of the field memory 61 and part of the control circuit 11 to control it. The operation of this circuit is described below referring to FIGS. 8 and 9.

Figure 8A:
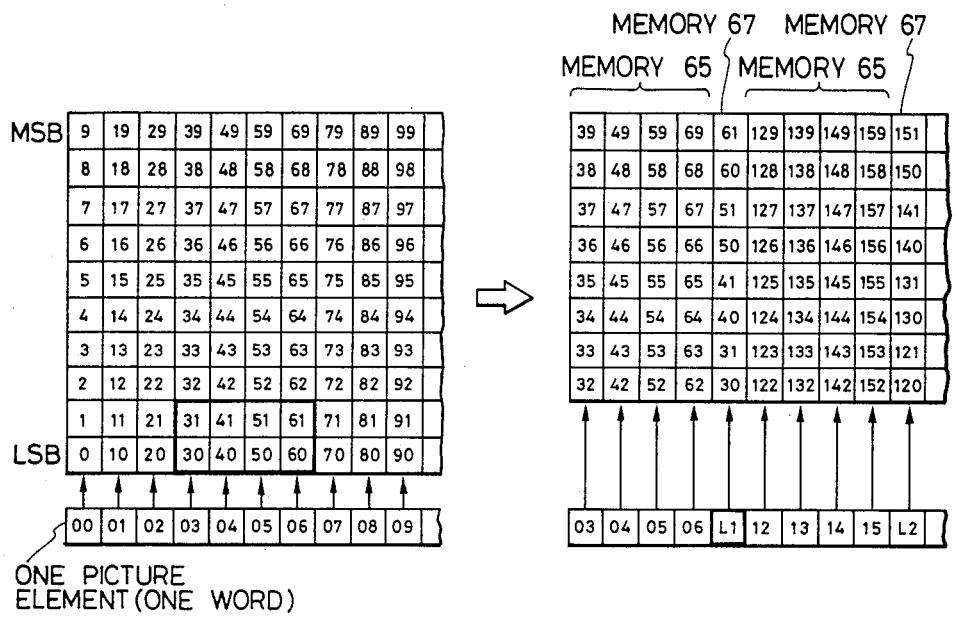
Figure 8B:
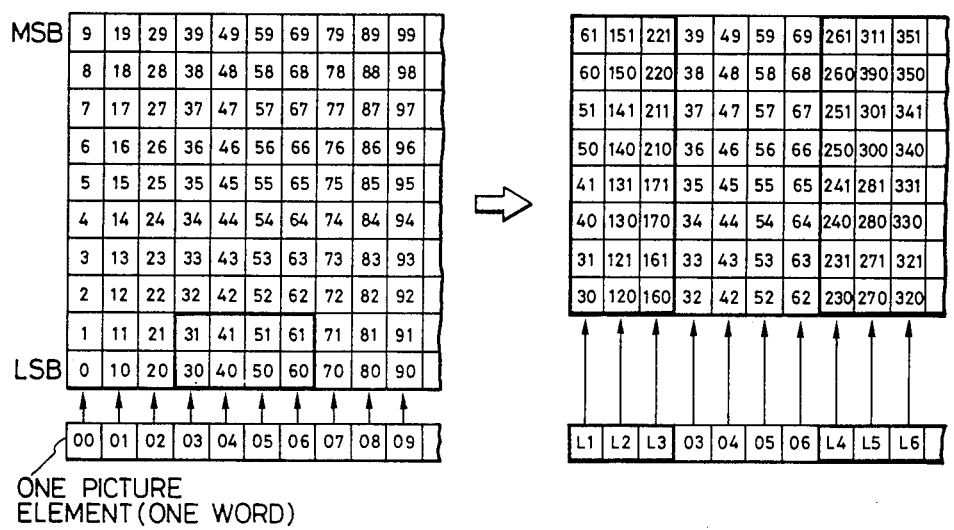

The left sides of FIGS. 8A and 8B show data of 10 bits corresponding to each picture element of 00, 01, 02, ----, 08, and 09. Each picture element has data of 10 bits such as 0, 1, 2, ---- 7, 8, and 9 for the picture element 00 and 10, 11, 12, ---, 17, 18, and 19 for the picture element 01. The 10-bit data of the picture elements 03, 04, 05, 06, 12, 13, ----, 94, 95, and 96 in the available picture element area as shown in FIG. 5B are written into the field memory 61. The 8 high-order bits of each picture element are written successively into the memory 65 and the 2 low-order bits are subjected to serial-parallel conversion by the shift register 66 and written into the memory 67 in the 8-bit unit. The data of each picture element is read out from the memories 65 and 67 through the multiplexer 68. At this time, the data of the memory 67 may be read out after all the data of the memory 65 is read out or the data of the 8 high-order bits of 03, 04, 05 and 06 may be read from the memory 65 first and then 2 low-bit data L1 of the data may be read out of the memories 65 and 67 in any way. It is also possible to read out the data L1, L2, and L3 of the 2 low-order bits from the memory 67 at the position corresponding to the picture elements 00, 01 and 02 in the in available video area, data of 8 high-order bits from the memory 65 at the position corresponding to each picture element of 03, 04, 05 and 06, and the data L4, L5, and L6 of the next 2 low-order bits from the memory 67 as shown in FIG. 8B. By reading out the data in succession so that the data of the 2 low-order bits of each picture element is positioned at the unavailable picture area in FIG. 5B, and the data of 8 high-order bits of each picture element at the available video area in this way, the image of the 8 high-order bits corresponding to the available video area is reproduced on the TV monitor in the form near the original image as shown in FIG. 9 so that the data of the 8 high-order bits can be checked easily.

The control circuit 11 in FIG. 7 is operated as described below. The counters 201 and 202 are the ones shown in FIG. 6A, into which the word clock CK1 and horizontal and vertical synchronous signals 13a and 13b are taken. The PROM 401 generates writing address WR of the 2 low-order bits to be written into the memory 67 from the address given by the counters 201 and 202. This writing address WR is fed to the memory 67 through the multiplexer 403. The PROM 402 generates the reading address RD for the 2 low-order bit data to read out of the memory 67 and control signal 404 for the multiplexer 68 from the address given by the counters 201 and 202. The control signals are synchronized with the reading address RD. As the control signal of the memory 65 corresponding to the 8 high-order bits, address WR and RD may be generated for simple 1-field delay. In FIG. 7, only the control circuit corresponding to the field memory 61 is shown. However, for the field memory 62, the control circuit may be composed based on the same concept as for FIG. 6A and on the same concept as in FIG. 6B for playback.

Generally, the processing unit is 8 bits in many digital recording systems and therefore such data composition ensures easy connection. A case of 1-field memory was shown above as an example of the digital memories 6 and 8 but memories of one-to-several fields which can buffer the data are also possible.

A case using a digital VTR which has been developed recently as the digital recording device 7 is described below.

A digital VTR converts TV signals (image signals) from analog to digital ones or vice versa at 8 or smaller bits and records the converted digital data on a magnetic tape as they are and plays them back. A helical scanning method using a rotary head is employed for this digital VTR and the image data is recorded on the magnetic tape in the format as shown in FIG. 10.

In the analog VTR, 1 field is recorded in one track but in the case of digital VTR, 1 field is divided into several tracks when recorded because of the high recording rate. Here, a case to divide 1 field into 2 tracks 21 and 22 to record it is described.

The upper half of the video signals (picture elements from 00 to 49 in FIG. 5B) are recorded on the track 21 and the lower half (picture elements from 50 to 99) on the track 22. In this case, the rotary head comes in contact with the magnetic tape 12 from the position A of the track 21, moves on the tape toward B recording or playing back, and is separated from the tape 12 at B. Generally, VTRs have such a disadvantage that the contact between the tape and head becomes unstable due to the impact at the point A where the head comes into contact with the tape first so that recording and playback of data are not conducted properly. In the case of an analog VTR, this disadvantage has an influence on the image at the end of the picture only, which is insignificant to the entire picture. However, in the case of the digital VTR, since 1 field is divided into several tracks, the image quality near the center of the picture is deteriorated due to code errors caused when the head and tape become in contact first. In other words, when 1 field is divided and recorded on 2 tracks, the image quality near the picture elements 50, 51, and 52 in FIG. 5B corresponding to the area where the head and tape are brought into contact first is damaged remarkably.

Therefore, when recording image signals in a digital VTR, dummy data or data of a part of the unavailable video area is arranged to the area where the head and tape come in contact first.

Figure 12:
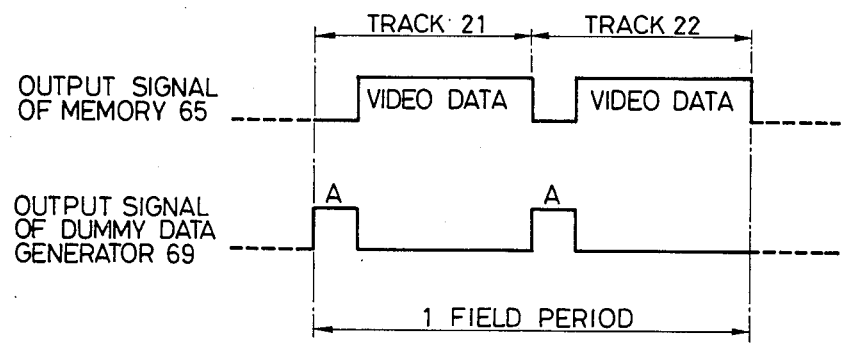
FIG. 12 shows the process of data conversion of another embodiment of the present invention.

Dummy data arranging method is described below referring to FIGS. 11, 12, and 13. FIG. 11 shows details of the field memory 61 in FIG. 6. The dummy data generator 69 generates dummy data unrelated to the video signals (e.g. repeated "0" and "1" pattern). Only signals of the available video area are written into the memory 65 at the same timing as in FIG. 4. The timing of reading out of the memory 65 and dummy data generator 69, that is, writing into the VTR is controlled as shown in FIG. 12 with the multiplexer 68. At the part A where the head comes into contact with the track 21 first, the dummy data from the dummy data generator 69 is selected and then video data from the memory 65 is selected and output. In the next track 21, dummy data is selected and then the video data from the memory 65 is selected and output in the same way.

Figure 13:
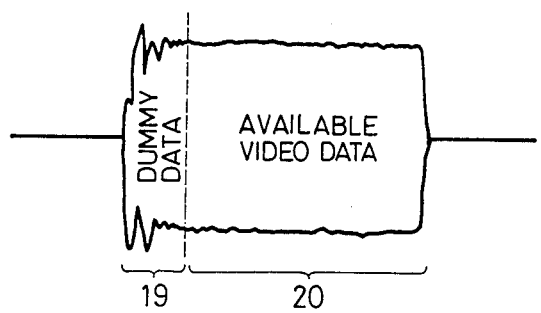
FIG. 13 shows the playback output waveform of data recorded by data conversion in FIG. 12.

FIG. 13 shows the playback output waveform corresponding to 1 track where the dummy data is arranged. The playback output waveform is composed of the dummy data 19 and data of the available video area 20. As shown in this figure, even when the playback signal output varies under the influence of the impact to the head at the time of playback, etc., almost all of the variation occurs at the dummy data 19, keeping the data of the available video area free from the influence of the variation. Resultantly, code errors, etc. caused at the area where the head of each track and tape are brought into contact first can be absorbed by this dummy data, preventing deterioration of quality of the data of the available video area, that is, the playback image.

In the case of digital VTR, 1 field is divided into more parts to obtain high recording density and recorded and played back with multiple heads. In such a case, similar effect can be obtained by dividing dummy data or unavailable video area into the number of the heads and arranging them.

Figure 14:
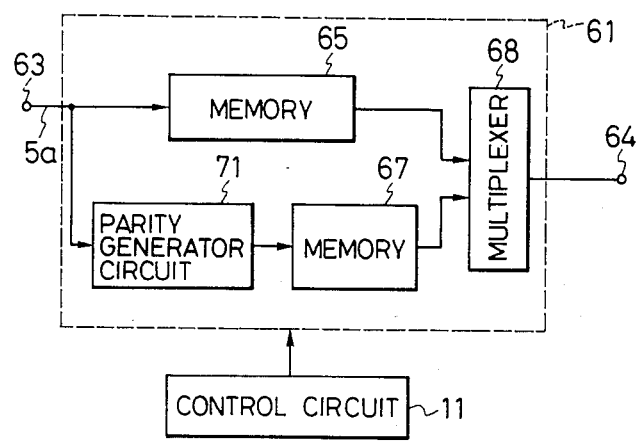

Generally, synchronous signals and parity bits for error correction are added when recording and playing back digital signals, usually to the part corresponding to the horizontal and vertical flyback line term of video signals (TV signals). It is generally known that the error correction ability is improved and the reliability of reproduced data is enhanced sharply by increasing the number of parity bits to correct errors at the time of playback. An embodiment to improve the reliability of data at the time of recording or playing back by adding parity bits to the unavailable video area is described below. FIG. 14 shows details of the field memory 61. The output signals 5a from the A/D converter 5 are input to the memory 65 and parity generator circuit 71. The parity generator circuit 71 operates the partiy bits for the data of the available image area written to the memory 65 and writes the parity bits to the memory 67. The data written to the memories 65 and 67 is selectively output with the multiplexer 68. In this case, the parity bits of the memory 67 are arranged at the area corresponding to the unavailable video area as in the data arrangement of the 2 low-order bits in FIG. 8B. Thus, by correcting errors in the available image area using the reproduced parity bits within the unavailable video area, the reliability of reproduced data can be improved.

As described above, when recording images for which a part of the picture has no signals as in medical images, the data rate can be reduced by transmitting or recording only the available video imaging area according to this embodiment. Also, when transmitting signals of different number of bits of 1 word such as signals to be transmitted to a system composed of data of 10 bits, well-matched transmission becomes possible by inserting data into the unavailable video imaging area also.

Moreover, by arranging data of non-signal term to the position where the head comes into contact, influence of the output varying at the tape end on the image quality can be reduced.

As an embodiment, an example where circular effective visibility is available on the entire picture was shown but, even when part of the circle is not contained in the picture, same treatment is possible though the rate varies slightly.

What is claimed is:

1. A digital recording and playback system for X-ray video signals comprising:
   intensifying means for receiving and intensifying X-rays into a substantially circular image region;
   scanning means for scanning said substantially circular image region by scanning a substantially rectangular region which includes said substantially circular image region, and for generating X-ray analog video signals correponding to pixel elements of said substantially rectangular region, said X-ray analog video signals comprising first video signals corresponding to said substantially circular image region within said substantially rectangular region and second video signals corresponding to a remaining portion of said substantially rectangular region which is outside of said substantially circular image region;
   first means for converting said X-ray analog video signals into corresponding first digital data including said first and second video signals, said first digital data including n data bits per pixel element (n: integer);
   second means for receiving said first digital data from said first means and for outputting second digital data consisting of m bits (m: integer <n) corresponding to said first video signal;
   third means for recording said second digital data on a recording medium and for playing back said second digital data from said recording medium;
   fourth means for receiving at least said second digital data from said third means and for generating third digital data indicative of said first digital data; and
   fifth means for receiving said third digital data from said fourth means and for generating thrid video signals indicative of said X-ray analog video signals,
   wherein said second means includes a first memory for storing m-bits of said first digital data, a second memory for storing remaining (n−m) bits of said first digital data as an m-bit unit, and a multiplexer for combining both outputs of said first and second memories into successive m-bit data.

2. A digital recording and playback system for X-ray video signals as set forth in claim 1, wherein said second means combines error correction data (parity bits) corresponding to said first video signals of said first digital data with said second video signals of said first digital data.

3. A digital recording and playback system according to claim 1, wherein the integer n is 10 and the integer m is 8.

4. A digital recording and playback system for X-ray video signals comprising:
   intensifying means for receiving and intensifying X-rays into a substantially circular image region;

scanning means for scanning said substantially circular image region by scanning a substantially rectangular region which includes said substantially circular image region, and for generating X-ray analog video signals corresponding to said substantially rectangular region, said X-ray analog video signals comprising first video signals corresponding to said substantially circular image region within said substantially rectangular region and second video signals corresponding to a remaining portion of said substantially rectangular region which is outside of said substantially circular iamge region;

first means for converting said X-ray analog video signals into corresponding first digital data including said first and second video signals;

second means for receiving said first digital data, for generating dummy data and for outputting second digital data including said dummy data and a part of said first digital data which corresponds to said first video signals;

third means for recording said second digital data onto a magnetic tape and for playing back said second digital data from said magnetic tape with a rotary magnetic head;

fourth means for receiving at least said second digital data from said third means and for generating third digital data indicative of said first digital data; and fifth means for receiving said third digital data from said fourth means and for generating third video signals indicative of said X-ray analog video signals.

* * * * *